United States Patent

Mochizuki et al.

Patent Number: 5,943,112
Date of Patent: *Aug. 24, 1999

[54] LIQUID CRYSTAL DISPLAY DEVICE AND ITS FABRICATING METHOD

[75] Inventors: Akihiro Mochizuki; Tetsuya Makino; Toshiaki Narusawa, all of Kawsaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/420,203

[22] Filed: Apr. 11, 1995

[30] Foreign Application Priority Data

Apr. 18, 1994 [JP] Japan ................................. 6-078975

[51] Int. Cl.⁶ ..................... C09K 19/02; G02F 1/1337
[52] U.S. Cl. ............................... 349/173; 349/128
[58] Field of Search .................. 349/126, 123, 349/172, 184, 128, 173

[56] References Cited

U.S. PATENT DOCUMENTS

| | | | |
|---|---|---|---|
| 4,778,259 | 10/1988 | Kitayama et al. | 350/341 |
| 4,836,653 | 6/1989 | Yoshino et al. | 350/341 |
| 5,061,044 | 10/1991 | Matsunaga | 349/128 |
| 5,227,905 | 7/1993 | Clark et al. | 349/173 |
| 5,231,528 | 7/1993 | Escher et al. | 359/104 |
| 5,353,136 | 10/1994 | Escher et al. | 349/173 |
| 5,400,159 | 3/1995 | Takao et al. | 349/126 |
| 5,500,749 | 3/1996 | Inaba et al. | 349/126 |
| 5,557,435 | 9/1996 | Hanyu et al. | 349/173 |
| 5,587,211 | 12/1996 | Togano et al. | 349/123 |
| 5,597,626 | 1/1997 | Eguchi | 349/123 |

FOREIGN PATENT DOCUMENTS

| | | |
|---|---|---|
| 0535892 | 4/1993 | European Pat. Off. . |
| 0539992 | 5/1993 | European Pat. Off. . |
| 62-257128 | 11/1987 | Japan . |
| 63-143529 | 6/1988 | Japan . |
| 63-235917 | 9/1988 | Japan . |
| 1302226 | 12/1989 | Japan . |
| 5224168 | 9/1993 | Japan . |
| 6-122875 | 5/1994 | Japan . |
| 2174820 | 11/1986 | United Kingdom . |
| 2263982 | 8/1993 | United Kingdom . |

OTHER PUBLICATIONS

M. Kimura et al., "Electrically and Optically Controlled Gray Scale In SSFLCDs", Priceedings of the SID, vol.31/2, 1990.

A.G.H. Verhulst et al., "The Texture Method: An Analog Gray–Scale Technique for SSFLC Displays Based on Local Reorientation of the Smectic Layers", Proceeding of the SID vol.32/4, 1991.

Primary Examiner—Tiep H. Nguyen
Attorney, Agent, or Firm—Greer, Burns & Crain, Ltd.

[57] ABSTRACT

A liquid crystal display device includes a first substrate, a first electrode pattern formed on the first substrate, a first molecular orientation film, formed on the first substrate to cover the first electrode pattern, for orienting liquid crystal molecules. The display device further includes a second substrate formed in a position parallel to and apart from the first substrate, a second electrode pattern formed on a surface of the second substrate facing the first substrate, a second molecular orientation film, formed on the second substrate to cover the second electrode pattern, for orienting the liquid crystal molecules. And the display device further includes a ferroelectric liquid crystal layer filled in a gap between the first molecular orientation film and the second molecular orientation film. In the liquid crystal display device, the first molecular orientation film orients the liquid crystal molecules inside the ferroelectric liquid crystal layer in a first direction, and the second molecular orientation film orients the liquid crystal molecules inside the ferroelectric liquid crystal layer in a second direction.

8 Claims, 8 Drawing Sheets

FIG. 2B
FIG. 2A
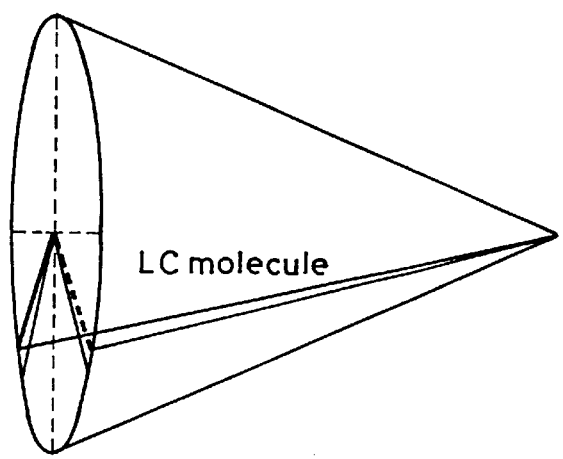
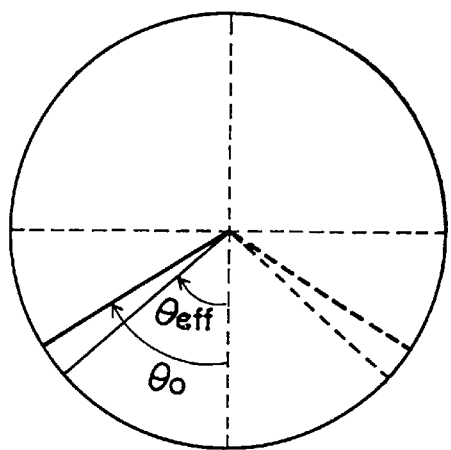
FIG. 2C
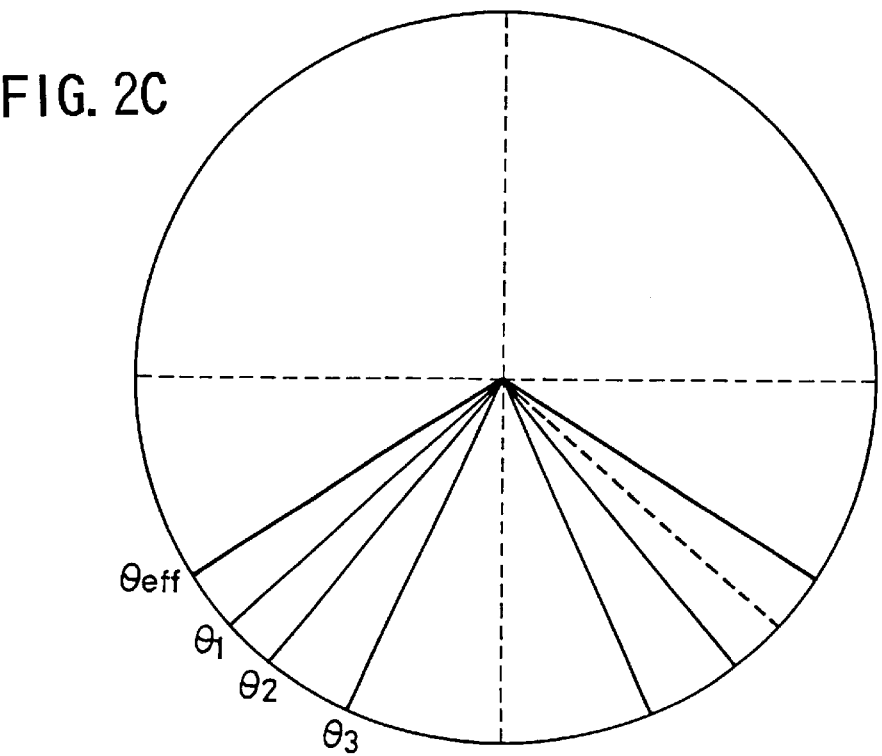

FIG. 6

| PANEL | INDEX P |
|---|---|
| A | 3.1 |
| B | 3.8 |
| C | 2.9 |
| D | 2.7 |
| E | 5.9 |
| F | 2.7 |
| G | 2.5 |
| H | 3.0 |
| I | 7.9 |
| J | 9.8 |
| K | 9.2 |
| L | 7.7 |
| M | 3.4 |
| N | 2.1 |

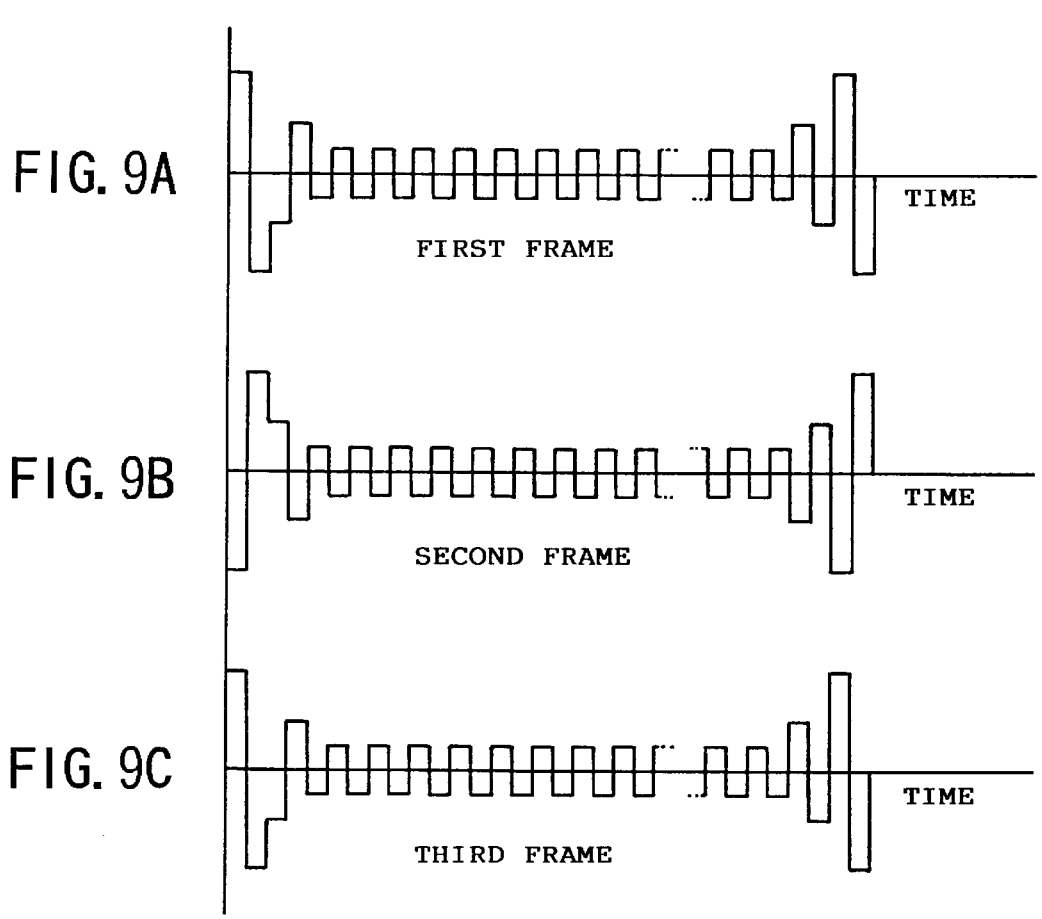
FIG. 9A FIRST FRAME
FIG. 9B SECOND FRAME
FIG. 9C THIRD FRAME

LIQUID CRYSTAL DISPLAY DEVICE AND ITS FABRICATING METHOD

BACKGROUND OF THE INVENTION

1. Field of the Invention

The present invention generally relates to a liquid crystal display device and its fabricating method, and more particularly, to a liquid crystal display device using ferroelectric liquid crystals.

Liquid crystal display devices are generally used as small-size and low-power consumption displays in small-size and low-cost portable information processing devices such as laptop types of personal computers and word processors. Because the liquid crystal display devices occupy little space, they are recently also being used in desktop types of the personal computers and the word processors.

2. Description of the Prior Art

A liquid crystal display device in conventional laptop types of personal computers and word processors mainly uses super twisted nematic (STN) liquid crystals. The STN liquid crystals can reversibly change their optical conditions according to an applied electric field, so that these crystals enable a gray-scale display with a halftone. The liquid crystal display device using the STN liquid crystals is generally constructed with a simple matrix driving method, which can display about 640×400 picture elements in a contrast ratio of about 10 to 1 at a relatively low voltage of about 20 V. However, there are problems with the simple matrix driving method when a display of a high information content, reaching to 1240×1028 thereof, which is required for a work station, is tried in the conventional liquid crystal display device. Since a driving voltage is directly supplied in sequence to each liquid crystal cell corresponding to a respective picture element through an X-electrode and a Y-electrode constructing a simple matrix in a time division method, a frequency of a driving pulse directly supplied to the liquid crystal cell becomes extremely high. There is thus a problem that a contrast between two adjoining picture elements is extremely degraded. And with this problem, a response speed and a visual field angle are also degraded such that it is difficult to satisfy a required display quality.

To overcome these problems, in a color liquid crystal display device having a higher information content, thin-film transistors (TFTs) are formed at cross points of the X-electrode and the Y-electrode constructing the simple matrix, and using the TFTs, the driving voltage is supplied to the liquid crystal cell corresponding to the respective picture element. This method is called an active matrix driving method. In the liquid crystal display device using the active matrix driving method, the TFTs in one X-line are selectively activated by an X-line selection pulse supplied to the X-electrode, and 1-bit image data supplied to the Y-electrode is written into each associated liquid crystal cell through the TFTs. In this way, in the active matrix driving method, the driving pulse supplied to the X-electrode and the Y-electrode does not directly drive the liquid crystal cell, but drives the liquid crystals individually through the TFTs. Therefore, this method is used for the color liquid crystal display devices having the high information content.

However, when constructing a large-size display device whose diagonal length is larger than, for example, 15 inches, which is to be used in the work station, an extremely large amount of TFTs need to be formed without a defect in the active matrix driving method. Therefore, there is a problem that a fabricating yield is degraded. And, in general, the TFTs, which are formed in a large area such as a face of the display device, are constructed with an amorphous silicon because of restrictions from semiconductor device fabrication technologies. In addition, since the amorphous silicon has a low electron mobility, there is also a problem that the response speed in the display device having the diagonal length more than 15 inches is degraded. In the present art, an application of the active matrix driving method is limited to a display device having a diagonal length less than 10 inches.

In this situation, a display device using ferroelectric liquid crystals is proposed for the liquid crystal display device having a large display area. The ferroelectric liquid crystals are materials having an optical bistability characterized in hysteresis. Therefore, by supplying a driving pulse similar to that used in the active matrix driving method to the liquid crystal cell through the X-electrode and the Y-electrode constructing the simple matrix, a desired optical condition may be maintained at a stable condition. Namely, by using the ferroelectric liquid crystals and a driving method similar to the conventional active matrix driving method, in a simple-configuration liquid crystal display device using the X-electrode and the Y-electrode constructing the simple matrix similar to that of the liquid crystal display device using the conventional STN liquid crystals, a high-resolution display of more than 1240×1028 picture elements in a wide area having the diagonal length larger than 15 inches may be realized with high quality and high stability. Further, the ferroelectric liquid crystals have advantages of a high response speed, a wide visual field angle, a high contrast, and a low cost.

As mentioned above, the liquid crystal display device using the ferroelectric liquid crystals is superior for the high-resolution display device of a high-performance information processing device. However, the ferroelectric liquid crystals are optical bistable materials, so that there is a problem that it is difficult to display the halftone.

To realize the gray scale display in methods except a halftone display in the ferroelectric liquid crystal display device, a variety of methods are proposed. For example, a single picture element is divided into a plurality of sub-picture elements, and by turning on/off these sub-picture elements, a gray-scale display may be realized. However, in this method, since the single picture element is divided into further elements, there is a problem that to realize the high-resolution display is difficult. On the other hand, even if the single picture element can be divided into the plurality of sub-picture elements, as a result of the division, a total number of the sub-picture elements becomes an extremely large number. Therefore, there is also a problem that it takes a long time to write image information on to the display. Further, for the extremely high information content, a large number of driving circuits need to be installed, so that there is a problem that it is difficult to physically connect the driving circuits with the X- or Y-electrode.

Also, other methods are proposed (for example, M. Kimura, et al., Proc. SID, vol.31/2, pp.139–143. 1990, and A. G. W. Verhulst, Proc. SID, vol.32/4, pp.379–386. 1991). In each of these methods, a domain, in which polarizations are reversed each other, is formed in the single picture element, and by controlling this domain, the gray-scale display in the ferroelectric liquid crystal display device may be realized without increasing a number of the picture elements. However, in these methods, it is difficult to always form the domains in a uniform density when there are more than one million picture elements, which is a number of picture elements necessary for the work-station display. And, a producing process of the domain is very sensitive to a temperature, there is thus a problem that a temperature control of the display is indispensable.

Further, yet another method is proposed as a modification of the method that the gray-scale display is realized by controlling the domain inside a ferroelectric liquid crystal layer. In this method, a molecular orientation film contacting with the liquid crystal layer is formed of a conductive material, and thus a reverse field generated with a reversing of the polarization in the domain disappears. Thus, the reversing of the polarization is hastened. However, when the molecular orientation film is formed of the conductive material, there is a substantial danger that the X-electrode and the Y-electrode are shorted to each other. And there are further problems that it is difficult to always produce the uniform domains, and the producing process of the domains is unstable to the temperature.

As mentioned above, when the gray-scale display is tried in the ferroelectric liquid crystal display device without using the halftone display, there are a variety of problems.

SUMMARY OF THE INVENTION

It is an object of this invention to provide a novel and useful liquid crystal display device in which the disadvantages described above are eliminated.

A more specific object of the present invention is to provide a liquid crystal display device realizing a halftone display by using a ferroelectric liquid crystal layer.

A still more specific object of the present invention is to provide a liquid crystal display device as a high-resolution liquid crystal display device having a long diagonal length, in which a halftone display having a stability to a temperature change is realized, and wherein the liquid crystal display device is easily fabricated.

The object described above is achieved by a liquid crystal display device comprising: a first substrate; a first electrode pattern formed on the first substrate; a first molecular orientation section, formed on the first substrate to cover the first electrode pattern, for orienting liquid crystal molecules; a second substrate formed in a position parallel to and apart from the first substrate; a second electrode pattern formed on a surface of the second substrate facing the first substrate; a second molecular orientation section, formed on the second substrate to cover the second electrode pattern, for orienting the liquid crystal molecules; and a ferroelectric liquid crystal layer filled in a gap between the first molecular orientation section and the second molecular orientation section; wherein the first molecular orientation section orients the liquid crystal molecules inside the ferroelectric liquid crystal layer in a first direction, and the second molecular orientation section orients the liquid crystal molecules inside the ferroelectric liquid crystal layer in a second direction.

The object described above is also achieved by a liquid crystal display device comprising: a first substrate; a first electrode pattern formed on the first substrate; a first molecular orientation section, formed on the first substrate to cover the first electrode pattern, for orienting liquid crystal molecules; a second substrate formed in a position parallel to and apart from the first substrate; a second electrode pattern formed on a surface of the second substrate facing the first substrate; a second molecular orientation section, formed on the second substrate to cover the second electrode pattern, for orienting the liquid crystal molecules; and a ferroelectric liquid crystal layer filled in a gap between the first molecular orientation section and the second molecular orientation section; wherein a chiral pitch of the liquid crystal molecules inside the ferroelectric liquid crystal layer is equal to or less than 3 times a thickness of the ferroelectric liquid crystal layer.

The object described above is also achieved by a method for fabricating a liquid crystal display device comprising a first substrate, a first electrode pattern formed on the first substrate, a first molecule orientation film formed on the first substrate to cover the first electrode pattern, a second substrate formed in a position parallel to and apart from the first substrate, a second electrode pattern formed on a surface of the second substrate facing the first substrate, a second molecular orientation section formed on the second substrate to cover the second electrode pattern, and a ferroelectric liquid crystal layer filled in a gap between the first molecular orientation section and the second molecular orientation section, the method comprising the step of; forming the first molecular orientation film and the second molecular orientation film such that internal energy is stored in the ferroelectric liquid crystal layer by the first molecular orientation film and the second molecular orientation film.

The object described above is also achieved by a method for driving a liquid crystal display device comprising a first substrate, a first electrode pattern formed on the first substrate, a first molecular orientation section, formed on the first substrate to cover the first electrode pattern, for orienting liquid crystal molecules, a second substrate formed in a position parallel to and apart from the first substrate, a second electrode pattern formed on a surface of the second substrate facing the first substrate, a second molecular orientation section, formed on the second substrate to cover the second electrode pattern, for orienting the liquid crystal molecules, and a ferroelectric liquid crystal layer filled in a gap between the first molecular orientation section and the second molecular orientation section, wherein the first molecular orientation section and the second molecular orientation section respectively orient the liquid crystal molecules inside the ferroelectric liquid crystal layer in a direction by which internal energy is stored in the ferroelectric liquid crystal layer, the method comprising the steps of: supplying a driving voltage pulse to the first electrode pattern and the second electrode pattern; and changing power of the driving voltage pulse to obtain a halftone.

The object described above is also achieved by a method for driving a liquid crystal display device comprising a first substrate, a first electrode pattern formed on the first substrate, a first molecular orientation section, formed on the first substrate to cover the first electrode pattern, for orienting liquid crystal molecules, a second substrate formed in a position parallel to and apart from the first substrate, a second electrode pattern formed on a surface of the second substrate facing the first substrate, a second molecular orientation section, formed on the second substrate to cover the second electrode pattern, for orienting the liquid crystal molecules, and a ferroelectric liquid crystal layer filled in a gap between the first molecular orientation section and the second molecular orientation section, wherein a chiral pitch of the liquid crystal molecules inside the ferroelectric liquid crystal layer is equal to or less than 3 times a thickness of the ferroelectric liquid crystal layer, the method comprising the steps of: supplying a driving voltage pulse to the first electrode pattern and the second electrode pattern; and changing power of the driving voltage pulse to obtain a halftone.

According to the liquid crystal display device, by storing internal energy inside the ferroelectric liquid crystal layer, a direction of polarization in a bistable condition of the liquid crystal molecules in the ferroelectric liquid crystal layer may be set at a slight tilt against a vertical direction to the substrate. As a result, by controlling the driving voltage supplied across the electrodes formed on the pair of substrates sandwiching the ferroelectric liquid crystal layer, the liquid crystal molecules are torqued. Thus, it is possible to control directions of orientations of the liquid crystal molecules. This control of the directions of the orientations of the liquid crystal molecules makes it possible to realize the halftone display by using the conventional ferroelectric liquid crystals which can realize only a two-shade display.

Other objects and further features of the present invention will be apparent from the following detailed description when read in conjunction with the accompanying drawings.

BRIEF DESCRIPTION OF THE DRAWINGS

FIGS. 2A to 2C show a principle of a liquid crystal display device according to the present invention;

FIG. 6 shows a table indicating indexes P for panels A to N;

FIGS. 9A to 9C show illustrations for explaining a frame modulation in a fourth embodiment according to the present invention.

DESCRIPTION OF THE PREFERRED EMBODIMENTS

In general, a ferroelectric liquid crystal molecule is thrust in a reversal direction in response to an electric field supplied from an external device and to an electric field coupled with an electric field generated by a spontaneous polarization. A reverse-torqued liquid crystal molecule is affected by a resistance due to a viscosity of liquid crystals. In this condition, a torque balance represented by equation (1) is defined:

$$\tau = \eta/(Ps\ E), \quad (1)$$

where $\tau$ is a relaxation time of a polarization reversal, $\eta$ is a viscosity factor of the liquid crystals, Ps is a magnitude of a spontaneous polarization of the liquid crystal molecule, and E is an applied electric field strength. It is found from the equation (1) that after the relaxation time $\tau$, a polarization direction of the liquid crystal molecule is set in a direction of the applied electric field E and an opposite direction thereof, this condition being a bistable condition (being called a memory state hereinbelow).

Figure 1A:
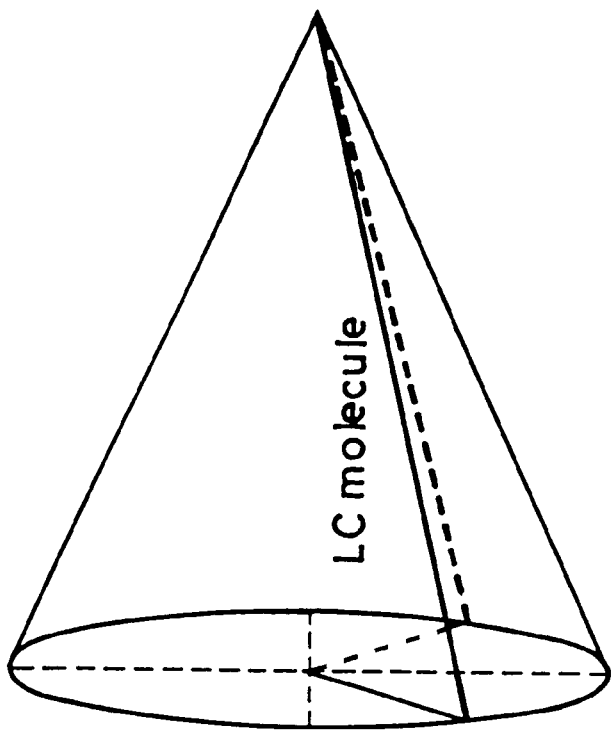
FIGS. 1A and 1B show a memory state of a ferroelectric liquid crystal molecule.
Figure 1B:
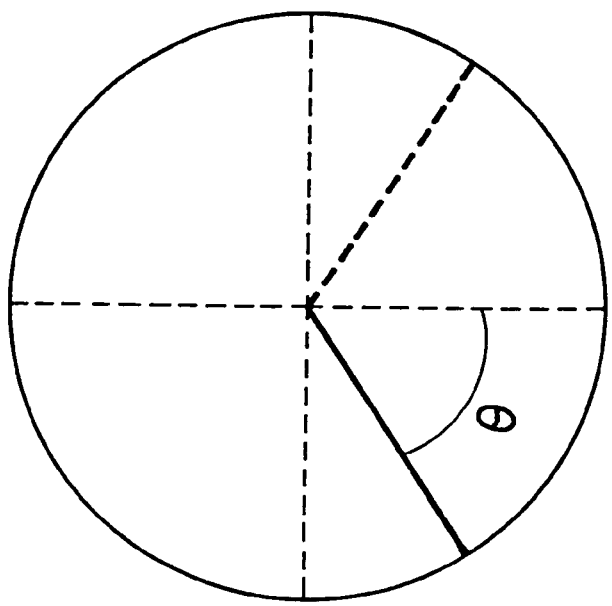

FIGS. 1A and 1B show the memory state of the ferroelectric liquid crystal molecule. In FIG. 1A, a solid line indicates a first memory state of the liquid crystal molecule, and a dotted line indicates a second memory state thereof. The liquid crystal molecule rotates its molecular long axis along with a conical shape. In FIG. 1A, in the first memory state, the liquid crystal molecule has a polarization direction toward an upper side, and in the second memory state, it has a polarization direction toward a lower side. FIG. 1B is a drawing in which the liquid crystal molecule shown in FIG. 1A is viewed to a bottom face of the cone. In FIG. 1B, the liquid crystal molecule is maintained in a stable memory state at a tilt angle $\Theta$. When such a ferroelectric liquid crystal layer is used for a liquid crystal display device, only a two-shade display may be realized in the device.

In the meantime, liquid crystals sandwiched by a pair of substrates have a configuration similar to that of a single crystal. Therefore, it is noticed that when internal energy or elastic energy is supplied into the liquid crystal layer by a certain method, the torque balance changes. Namely, it is suspected that the supplied internal energy shifts the polarization direction of the memory state of the liquid crystal molecule. We have found that the torque balance taking into account the supplied internal energy is represented by an equation (2):

$$\tau = \Theta_{eff}(\eta + Te)\ \tan\ \Theta_0/(\Theta_0 Ps\ E), \quad (2)$$

where $\Theta_{eff}$ is a tilt angle of the liquid crystal molecule in the bistable condition, $\Theta_0$ is a tilt angle in a case a substantially large field is supplied, and corresponds to the tilt angle $\Theta$ shown in FIG. 1B, and, Te is an elastic energy factor of the liquid crystals.

The equation (2) shows that a term corresponding to the viscosity factor $\eta$ in the equation (1) includes the elastic energy factor Te, and shows that the tilt angle $\Theta_{eff}$ of the liquid crystal molecule in the memory state is determined by the viscosity factor $\eta$ and the elastic energy factor Te of the liquid crystals. In the meantime, the elastic energy factor Te is determined by an initial molecular orientation condition of the liquid crystal layer. The initial molecular orientation condition of the liquid crystal layer includes conditions of a molecular orientation in a boundary between a substrate and the liquid crystal layer and a structure of the liquid crystal layer. Only a discussion regarding a liquid crystal layer having a bookshelf-layer structure follows. However, the a similar discussion exists for a liquid crystal layer having a Chevron-layer structure.

In the bookshelf-layer structure, the orientations of the liquid crystal molecules are uniform. Therefore, in an ideal case that the elastic energy is not stored, the liquid crystal molecules have the spontaneous polarization being in the vertical direction to the substrate. In this condition, the tilt angle of the liquid crystal molecule is the angle $\Theta_0$.

When a certain processing is carried out in the substrate boundary, and the elastic energy is applied to the liquid crystal layer, the tilt angle $\Theta_{eff}$ in the memory state becomes a different angle than the angle $\Theta_0$. At this time, it has been found that a magnitude of the actual tilt angle $\Theta_{eff}$ changes according to the elastic energy and the applied electric field strength E, and becomes a value close to the angle $\Theta_0$ when the electric field strength E is increased. This means that also in the liquid crystal display using the ferroelectric liquid crystal layer, if the elastic energy is applied to the ferroelectric liquid crystal layer, a transmittance of the layer is controllable according to the applied electric field strength E, and, as a result, the above makes it possible to display the halftone.

First, a description will be given of a principle of the liquid crystal display according to the present invention, by referring to FIGS. 2A to 2C. FIGS. 2A and 2B correspond to FIGS. 1A and 1B, respectively. And a tilt angle $\Theta_0$ shown in FIG. 2B corresponds to the tilt angle $\Theta$ shown in FIG. 1B. As shown in FIGS. 2A and 2B, in the memory state, the tilt angle of the liquid crystal molecule is maintained at the different tilt angle $\Theta_{eff}$ from the tilt angle $\Theta_0$. In such a memory state, as mentioned before, the polarization direction of the liquid crystal molecule is not identical to a direction of the electric field E or its reverse direction. Therefore, according to the applied electric field E, the tilt angle, in a balanced condition in which the torque balance is established, changes as shown by angles $\Theta_1$ to $\Theta_3$ in FIG. 2C. The applied electric field E is determined by a sum of a reverse electric field Ei formed inside the liquid crystal layer and an external electric field Eex. Therefore, by controlling the external electric field Eex, the tilt angle $\Theta$ is freely controllable. When the external electric field Eex is removed, the tilt angle $\Theta$ is identical to the actual tilt angle $\Theta_{eff}$ which is determined by the internal reverse electric field Ei, the elastic energy, and the viscosity factor. Thus, the control of the tilt angle makes it possible to display the halftone in a liquid crystal display panel using the ferroelectric liquid crystal layer.

There are a variety of methods for supplying the internal energy or the elastic energy into the liquid crystal layer. For example, a molecular orientation film may be formed on upper- and lower-side substrates sandwiching the liquid crystal layer such that a direction of the molecular orientation in the upper-side substrate is different from that in the lower-side substrate. Thus, the elastic energy may be supplied to the liquid crystal layer. In further detail, the upper-side substrate and the lower-side substrate may be put together such that the molecule-orientation directions of the upper-side and the lower-side substrates are different after dipping the substrates into a surfactant and constructing the liquid crystal display device. Thus, the desired elastic energy may be supplied to the liquid crystal layer.

Also, the same effect may be obtained by crossing directions of rubbing of the molecular orientation films formed in the upper-side and the lower-side substrates. Further, when forming the molecular orientation film on the upper-side and the lower-side substrates by an oblique evaporation method using SiO, etc., evaporation directions in the upper-side and the lower-side substrates may be shifted away from each other. And also by forming the molecular orientation films on the upper-side and the lower-side substrates by different methods, the elastic energy may be applied to the liquid crystal layer. In the case that the directions of the molecular orientation films in the upper-side and the lower-side substrates are shifted away from each other, an angle range of 0.5 to 45 degrees is effective.

And by setting an interval between the upper-side and the lower-side substrates such that a chiral pitch of the liquid crystal molecules constructing the ferroelectric liquid crystal layer is less than 3 times a thickness of the liquid crystal layer, the elastic energy may be supplied to the liquid crystal layer. In this case, it is not surely necessary to shift the molecular orientation directions of the molecular orientation films of the upper-side and the lower-side substrates away from each other, but the shift is permitted as mentioned before.

When driving the liquid crystal display device using the ferroelectric liquid crystal layer to which the elastic energy is supplied, controlling the driving voltage supplied to electrodes formed in the upper-side and the lower-side substrates makes it possible to display the halftone as shown in FIG. 2C. And it permits combining the halftone display with a gray-scale display method using a conventional frame modulation method or a tone production method by density of each element.

Figure 3:
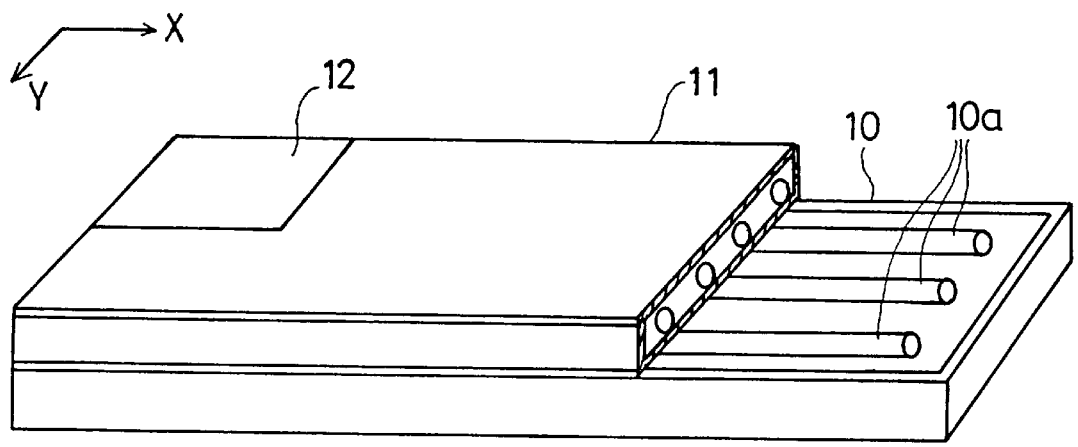
FIG. 3 shows a perspective view of a first embodiment of the liquid crystal display device according to the present invention.

In the following, a description will be given of a first embodiment of the liquid crystal display device according to the present invention, by referring to FIG. 3 and FIG. 4. FIG. 3 shows a perspective view of the first embodiment of the liquid crystal display device according to the present invention.

As shown in FIG. 3, the liquid crystal display device has a standard configuration, and comprises a backlight unit 10 including light sources 10a, and a liquid crystal display panel 11 arranged on the backlight unit 10. A pair of polarizers are arranged on a top face and a bottom face of the liquid crystal display panel 11. However, in FIG. 3, only an upper-side polarizer 12 is illustrated on the top face of the liquid crystal display panel 11.

Figure 4:
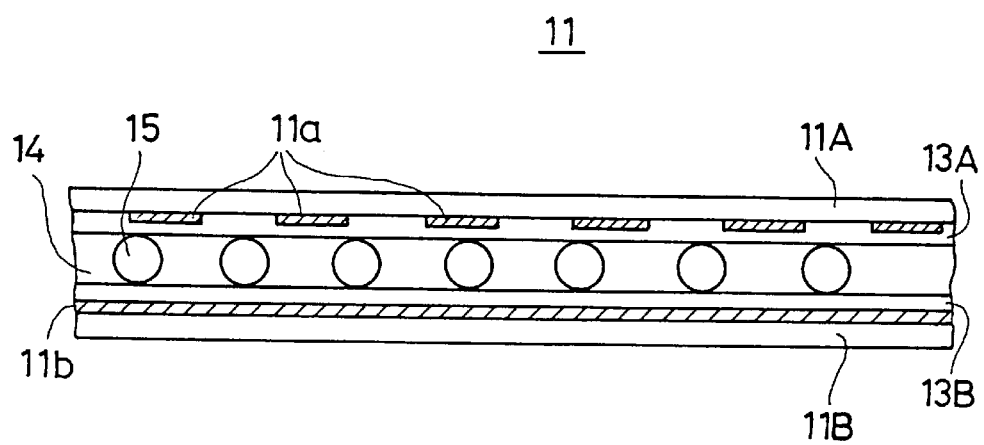
FIG. 4 shows a cross-sectional view of a liquid crystal display panel of the liquid crystal display device shown in FIG. 3.

FIG. 4 shows a cross-sectional view of the liquid crystal display panel 11 of the liquid crystal display device shown in FIG. 3.

As shown in FIG. 4, the liquid crystal display panel 11 comprises an upper-side substrate 11A and a lower-side substrate 11B. On a bottom surface of the upper-side substrate 11A, a plurality of transparent stripe electrodes 11a are formed extending along an X direction shown in FIG. 3. In the same way, on a top surface of the lower-side substrate 11B, a plurality of transparent stripe electrodes 11b are formed extending along a Y direction shown in FIG. 3. The transparent stripe electrodes 11a are covered with a molecular orientation film 13A, and the transparent stripe electrodes 11b are covered with a molecular orientation film 13B.

The substrate 11A and the substrate 11B are each made of a sodium glass having a thickness of 1.1 mm, and sandwiches silica balls, each of which has a diameter of 1.5 $\mu$m, used as spacers. When the substrate 11A and the substrate 11B are put together in the above way, liquid crystals are supplied into a gap formed between the molecular orientation films 13A, 13B. As a result, a ferroelectric liquid crystal layer 14 is formed.

Typically, the molecular orientation films 13A, 13B are formed by spin-coating, for example, a polyimide, and setting the molecular orientation direction by rubbing, etc. And the molecular orientation films 13A, 13B may be formed also by the oblique evaporation method using SiO which will be described later. Further, the molecular orientation films 13A, 13B may be formed also by particularly treating the surface of the substrate 11A and/or the substrate 11B with the surfactant, etc. In which case, the surfaces of the substrates 11A, 11B are used as the molecular orientation films 13A, 13B. The above particularly treated surface is a kind of film. As the liquid crystals forming the ferroelectric liquid crystal layer 14, a liquid crystal composite of a naphthalene system may be used. More specifically, in the liquid crystal display device according to the present invention, it is preferred to use a liquid crystal composite proposed in a specification of Japanese Laid-Open Patent Application No. 6-122875.

In the following, descriptions will be given of examples of an experiment and a comparison of the first embodiment of the liquid crystal display device according to the present invention.

i) EXPERIMENT 1

In this experiment 1, the molecular orientation films 13A, 13B were formed by embellishing the surfaces of the substrates 11A, 11B. At that time, to store the elastic energy in the ferroelectric liquid crystal layer 14, the molecular orientation direction was changed between the molecular orientation films 13A, 13B. In further detail, first the transparent electrodes 11a, 11b were formed on the substrates 11A, 11B, respectively, and then these parts were washed with an alkali detergent, rinsed with pure water, and then dried. Next, the substrates 11A, 11B processed in this way were dipped in the surfactant comprising a silane coupling agent of a low-level fatty acid system, for example, an alcohol solution of 0.7 wt % of a methylaminopropyltrimethoxysilylchloride (MAP), and after the dip, the faces of the substrates 11A, 11B were chemically embellished. After taking the substrates 11A, 11B out of the surfactant, the substrates 11A, 11B were dried at a normal temperature for about 30 minutes, and then dried at a temperature of 90° C. for about 1 hour.

In this experiment, when pulling up the substrates 11A, 11B out from the surfactant, the directions of the substrates 11A, 11B were allowed to be offset from the vertical direction or a pulling-up direction. For example, when the substrate 11A was pulled up in its extending direction, the substrate 11B was pulled up in a direction tilted by 0.5 to 45 degrees from the extending direction. Next, these substrates 11A, 11B were put together sandwiching the 1.5-μm-diameter silica balls used as spacers. Then, the ferroelectric liquid crystal layer 14 made of the liquid crystals of the naphthalene system was used to fill in the gap between the substrates to form the liquid crystal display panel. Because the molecular orientation directions of the substrates 11A, 11B are different each other in that liquid crystal display panel, the elastic energy may be supplied to the ferroelectric liquid crystal layer 14. Now, a panel, in which the directions of the substrates 11A, 11B when being pulled up from the surfactant were shifted by 15 degrees from each other, is referred to as "a panel A". As will be mentioned in detail later, in the panel A, because the elastic energy defined in the equation (2) is supplied to the ferroelectric liquid crystal layer 14, the transmittance of the panel A may be changed according to the voltage supplied across the electrodes 11a, 11b. In this way, it was proved that it is possible to display the halftone in this liquid crystal display.

ii) EXPERIMENT 2

In an experiment 2, first, the transparent electrodes 11a, 11b were formed on the substrates 11A, 11B, respectively, in the same way as in the experiment 1. And after washing these parts, the molecular orientation layers 13A, 13B of the polyimide films having a thickness of 60 nm were formed to cover the transparent electrodes 11a, 11b, respectively, by means of the spin coating method. Next, the polyimide films were cured, and then rubbed using a nylon buff. The rubbing was carried out such that rubbing directions of the molecular orientation films 13A, 13B in the liquid crystal panel crossed each other at an angle of 0.5 to 45 degrees.

Next, the substrates 11A, 11B were put together to sandwich the 1.5-μm-diameter silica balls used as the spacers, in such a way that the rubbing direction of the molecular orientation films 13A, 13B were crossed at the angle of 0.5 to 45 degrees. The ferroelectric liquid crystal layer 14 made of the liquid crystals of the naphthalene system was used to fill in the gap between the substrates to form the liquid crystal display panel.

Now, a panel, in which the rubbing directions of the molecular orientation films 13A, 13B cross each other at an angle of about 10 degrees, is referred to as "a panel B". As will be mentioned in detail later, in the panel B, because the elastic energy defined in the equation (2) is supplied to the ferroelectric liquid crystal layer 14, the transmittance of the panel B may be changed according to the voltage supplied across the electrodes 11a, 11b. In this way, it was proved that it is possible to display the halftone in this liquid crystal display.

iii) EXPERIMENT 3

In an experiment 3, first, the transparent electrodes 11a, 11b were formed on the substrates 11A, 11B, respectively, in the same way as in the experiment 1. And after washing these parts, the molecular orientation layers 13A, 13B having a thickness of 35 nm were formed to cover the transparent electrodes 11a, 11b, respectively, by means of the oblique evaporation method with SiO. When the evaporation was carried out, one of the substrates 11A, 11B, for examples, the substrate 11B, was standing in the vertical direction, and the other one of the substrates 11A, 11B, for example, the substrate 11A, was supported such that its extending direction was tilted by 0.5 to 45 degrees from the vertical direction.

Next, the substrates 11A, 11B having such molecular orientation films were put together to sandwich the 1.5-μm-diameter silica balls used as the spacers, in such a way the extending direction of each of the substrates 11A, 11B were the same as each other. The ferroelectric liquid crystal layer 14 made of the liquid crystals of the naphthalene system was used to fill in the gap between the substrates to form the liquid crystal display panel.

In this liquid crystal panel, the molecular orientation films 13A, 13B were supported such that their evaporation directions were tilted away from each other by 0.5 to 45 degrees. Now, a panel, in which the evaporation directions of the molecular orientation films 13A, 13B were tilted away from each other by 4.5 degrees is referred as "a panel C". As will be mentioned in detail later, in the panel C, because the elastic energy defined in the equation (2) is supplied to the ferroelectric liquid crystal layer 14, the transmittance of the panel C may be changed according to the voltage supplied across the electrodes 11a, 11b. In this way, it was proved that it is possible to display the halftone in this liquid crystal display.

iv) EXPERIMENT 4

In an experiment 4, first, the transparent electrodes 11a, 11b were formed on the substrates 11A, 11B, respectively, in the same way as in the experiment 1. And after washing these parts, on one of the substrates 11A, 11B, for example, the substrate 11A, the molecular orientation layer 13A having a thickness of 35 nm was formed to cover the transparent electrode 11a, by means of the oblique evaporation method with SiO. At that time, the substrate 11A was supported such that its extending direction was tilted by 4.5 degrees away from the vertical direction. And the evaporating direction was tilted by 85 degrees away from a vertical direction to the face of the substrate 11A. On the other hand, on the other one of the substrates 11A, 11B, for example, the substrate 11B, the molecular orientation film 13B having a thick of 60 nm was formed by the spin coating of the polyimide. And the rubbing was carried out along the extending direction using the nylon buff.

Next, the substrates 11A, 11B, in which such molecular orientation films 13A, 13B were formed, were put together to sandwich the 1.5-μm-diameter silica balls used as the spacers, such that their extending directions were the same as each other. And the ferroelectric liquid crystal layer 14 made of the liquid crystals of the naphthalene system was used to fill in the gap between the substrates to form the liquid crystal display panel D. As will be mentioned in detail later, in the panel D, because the elastic energy defined in the equation (2) is supplied to the ferroelectric liquid crystal layer 14, the transmittance of the panel D may be changed according to the voltage supplied across the electrodes 11a, 11b. In this way, it was proved that it is possible to display the halftone in this liquid crystal display.

v) EXPERIMENT 5 (including a comparison)

In an experiment 5, first, the transparent electrodes 11a, 11b were formed on the substrates 11A, 11B, respectively, in the same way as in the experiment 1. And after washing these parts, the molecular orientation layers 13A, 13B having a thickness of 35 nm were formed to cover the transparent electrodes 11a, 11b, respectively, by means of the oblique evaporation method with SiO. When the evaporation was carried out, the substrate 11A was supported such that its extending direction was tilted by 0, 5, 10, and 15 degrees away from the vertical direction. While, the substrate 11B was supported such that its extending direction was identical to the vertical direction.

Next, the substrates 11A, 11B were put together to sandwich the 1.5-μm-diameter silica balls used as the spacers, such that the extending direction of each of the substrates 11A, 11B was the same as each other. The ferroelectric liquid crystal layer 14 made of the liquid crystals of the naphthalene system was used to fill in the gap between the substrates to form the liquid crystal display panel.

Now, a panel, in which the extending direction of the substrate 11A is set in the vertical direction when forming the molecular orientation film 13A, is referred to as "a panel E". And a panel, in which the extending direction of the substrate 11A is set in a direction tilted by 5 degree from the vertical direction, is referred to as "a panel F". Further, panels, in which the extending directions of the substrate 11A are set in directions tilted by 10 and 15 degrees from the vertical direction, are referred to as "a panel G" and "a panel H", respectively. In the panel E, the molecular orientation directions of the molecular orientation films 13A, 13B are in parallel with each other, and this configuration corresponds to the conventional configuration in which the elastic energy defined by equation (2) is not supplied to the ferroelectric liquid crystal layer 14. Namely, the panel E is an object of the comparison. On the contrary, in each of the panels F, G, H, as will be mentioned in detail later, because the elastic energy defined in the equation (2) is supplied to the ferroelectric liquid crystal layer 14, the transmittance of each panel may be changed according to the voltage supplied across the electrodes 11a, 11b. In this way, it was proved that it is possible to display the halftone in these liquid crystal displays.

i) COMPARISON 1

In this experiment for the comparison 1, first, the transparent electrodes 11a, 11b were formed on the substrates 11A, 11B, respectively, in the same way as in the experiment 1. And after washing these parts, the molecular orientation layers 13A, 13B were formed to cover the transparent electrodes 11a, 11b, respectively, by means of the spin coating of the polyimide. Then, the formed molecular orientation films 13A, 13B were rubbed with the nylon buff in an anti-parallel fashion. After that, the substrates 11A, 11B were put together to sandwich the 1.5-μm-diameter silica balls used as the spacers. And the ferroelectric liquid crystal layer 14 made of the liquid crystals of the naphthalene system was used to fill in the gap between the substrates 11A, 11B to form a liquid crystal display panel I.

In this liquid crystal panel I, the molecular orientation directions of the molecular orientation films 13A, 13B are in parallel with each other, therefore, the elastic energy is not supplied to the ferroelectric liquid crystal layer 14. As will be mentioned in detail later, the panel I has two-level transmission characteristics, and it was proved that this display panel is not suitable for the halftone display.

ii) COMPARISON 2

In the experiment for the comparison 2, first, the transparent electrodes 11a, 11b were formed on the substrates 11A, 11B, respectively, in the same way as in the experiment 1. And after washing these parts, the molecular orientation layer 13A having a thickness of 35 nm was formed to cover the transparent electrode 11a, by means of the oblique evaporation method with SiO. When the evaporation was carried out, the substrate 11A was supported such that its extending direction was in the vertical direction, and the evaporation was carried out at the tilted angle of 85 degrees from a vertical direction to the face of the substrate. While, on the substrate 11B, the molecular orientation film 13B was formed by spin coating the polyimide, and the molecular orientation film 13B was rubbed along the extending direction of the substrate 11B.

Next, the substrates 11A, 11B, on which such molecular orientation films 13A, 13B were formed, were put together to sandwich the 1.5-μm-diameter silica balls used as the spacers, such that the evaporating direction was identical to the rubbing direction. And the ferroelectric liquid crystal layer 14 made of the liquid crystals of the naphthalene system was used to fill in the gap between the substrates to form a liquid crystal display panel J.

In this liquid crystal panel J, the molecular orientation directions of the molecular orientation films 13A, 13B are the same, so that the elastic energy is not supplied to the ferroelectric liquid crystal layer 14. Therefore, a configuration of the panel J corresponds to the conventional configuration. As will be mentioned in detail later, the panel J has two-level transmission characteristics, and it was proved that this display panel is not suitable for the halftone display.

Next, a description will be given of a second embodiment of the liquid crystal display device according to the present invention.

In this embodiment, without setting different molecular orientation directions of the molecular orientation films 13A, 13B, the elastic energy may be supplied to the ferroelectric liquid crystal layer 14. In further detail, a relationship of a chiral pitch of the liquid crystal to a thickness of the gap between the substrates 11A, 11B is changed. In a general ferroelectric liquid crystal display device, to restrict chiral orientations of the liquid crystal molecules and to obtain a single crystal configuration having uniform orientation directions, the thickness of the gap between the substrates 11A, 11B is set to a substantially short length compared to a natural chiral pitch of the liquid crystal molecule. On the contrary, in this embodiment, by the chiral pitch of the liquid crystal molecule constructing the ferroelectric liquid crystal layer 14 being set to be less than 3 times the thickness of the gap, it is found that the elastic energy may be supplied to the ferroelectric liquid crystal layer 14.

In this embodiment, in a panel having the same configuration as that of the panel E, the thickness of the gap between the substrates 11A, 11B is set to 1.7 μm, and the ferroelectric liquid crystals having the chiral pitches of 10.5 μm, 8.2 μm, 4.1 μm, and 2.4 μm are used to fill in the gap. To form the liquid crystal molecules having such different pitches, by mixing a non-chiral liquid crystal (smectic-C phase) of a phenyl benzo ester system with a chiral liquid crystal (chiral smectic-C phase) having a structure of the phenyl benzo ester system, the ferroelectric liquid crystal (chiral smectic-C phase) may be obtained as a mixture. In this mixing, by changing a mixing ratio of the chiral liquid crystal to the non-chiral liquid crystal, the chiral pitch of the liquid crystal mixture may be adjusted. In further detail, by the mixing ratio of 1/10, 2/10, 3/10, or 4/10, the chiral pitch may be set to 10.5 μm, 8.2 μm, 4.1 μm, or 2.4 μm. Now, a panel which is supplied with the liquid crystal of the chiral pitch of 10.5 μm is referred as "a panel K", a panel which is supplied with the liquid crystal of the chiral pitch of 8.2 μm is referred as "a panel L", a panel which is supplied with the liquid crystal of the chiral pitch of 4.1 μm is referred as "a panel M", and a panel which is supplied with the liquid crystal of the chiral pitch of 2.4 μm is referred as "a panel N".

<MEASUREMENT>

Figure 5:
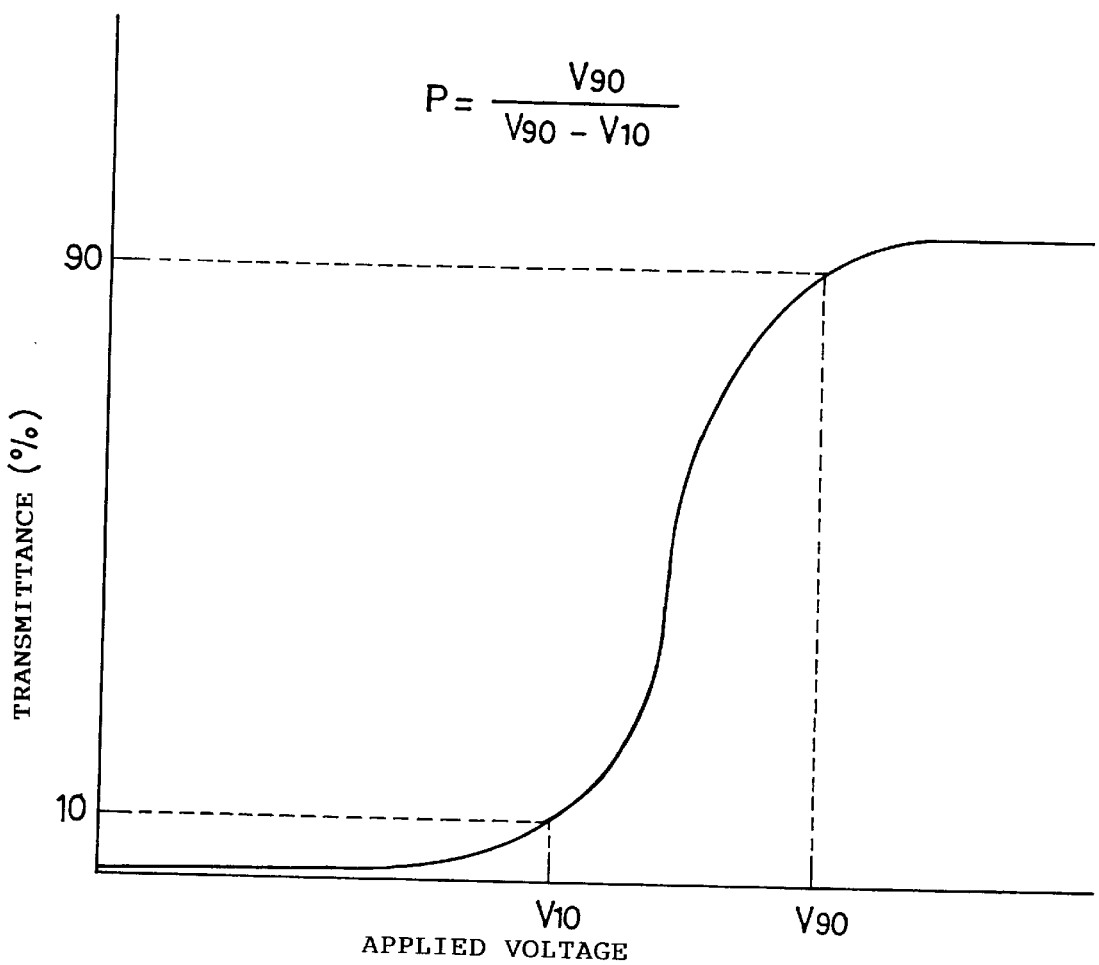
FIG. 5 shows a typical graphical representation of transmission performance of ferroelectric liquid crystal display devices in the first embodiment and a second embodiment according to the present invention.

In the following, a description will be given of transmission performance of the panels A to N. The transmission performance of the panels A to N was measured while changing the voltage applied across the electrodes 11a, 11b. FIG. 5 shows a typical graphical representation of the transmission performance of the ferroelectric liquid crystal display devices in the first embodiment and the second embodiment according to the present invention. In this drawing, an index P indicating a display ability of the halftone can be represented in a following equation (3):

$$P = V_{90}/(V_{90} - V_{10}), \qquad (3)$$

where $V_{90}$ is an applied voltage at 90% transmittance in the liquid crystal display panel, and $V_{10}$ is an applied voltage at 10% transmittance therein. In this equation (3), it is found that a smaller P gives a smaller ratio of the transmittance and the applied voltage which indicates a gentle steepness in the transmittance-voltage curve. Using the gentle steepness curve, a driving window for grayshades is generally wide resulting in a good performance of the grayshades reproductivity.

FIG. 6 shows a table indicating the index P for the panels A to N. As shown in FIG. 6, in the panels A to D, F to H, M, and N, the indices approximately indicate values of 2 to 3, and these panels may display the halftone. However, in the panels E, I, and J, which correspond to the conventional panels, the indexes of these panels have larger values than 5, indicating almost two-level transmittance characteristics. Further, in a case that the pitch of the liquid crystal molecules exceeds the 3 times the thickness of the liquid crystal layer in the second embodiment, namely in panels K, L, each index P of the panels exceeds a value of 7, and thus the panels have almost the two-level transmittance characteristics. The pitch is a parameter of bulk liquid crystal molecules.

As mentioned above, in the liquid crystal display device according to the present invention, the directions of the molecular orientation films are allowed to be different in the upper-side and the lower-side substrates, or the pitch of the liquid crystal molecules is set to less than 3 times the thickness of the liquid crystal layer. In each way, the elastic energy or the internal energy is supplied to the liquid crystal layer, and therefore, the orientation according to the voltage supplied to the liquid crystal layer may be induced in the liquid crystal molecules. As a result, it is possible to display the halftone in the ferroelectric liquid crystal panel.

In the panels M, N, the molecular orientation directions of the upper-side and the lower-side molecular orientation films are in parallel corresponding to the configuration of the panel E. However, in the same way as that of the other embodiments, the directions of the two molecular orientation films are permitted to be different.

Figure 7:
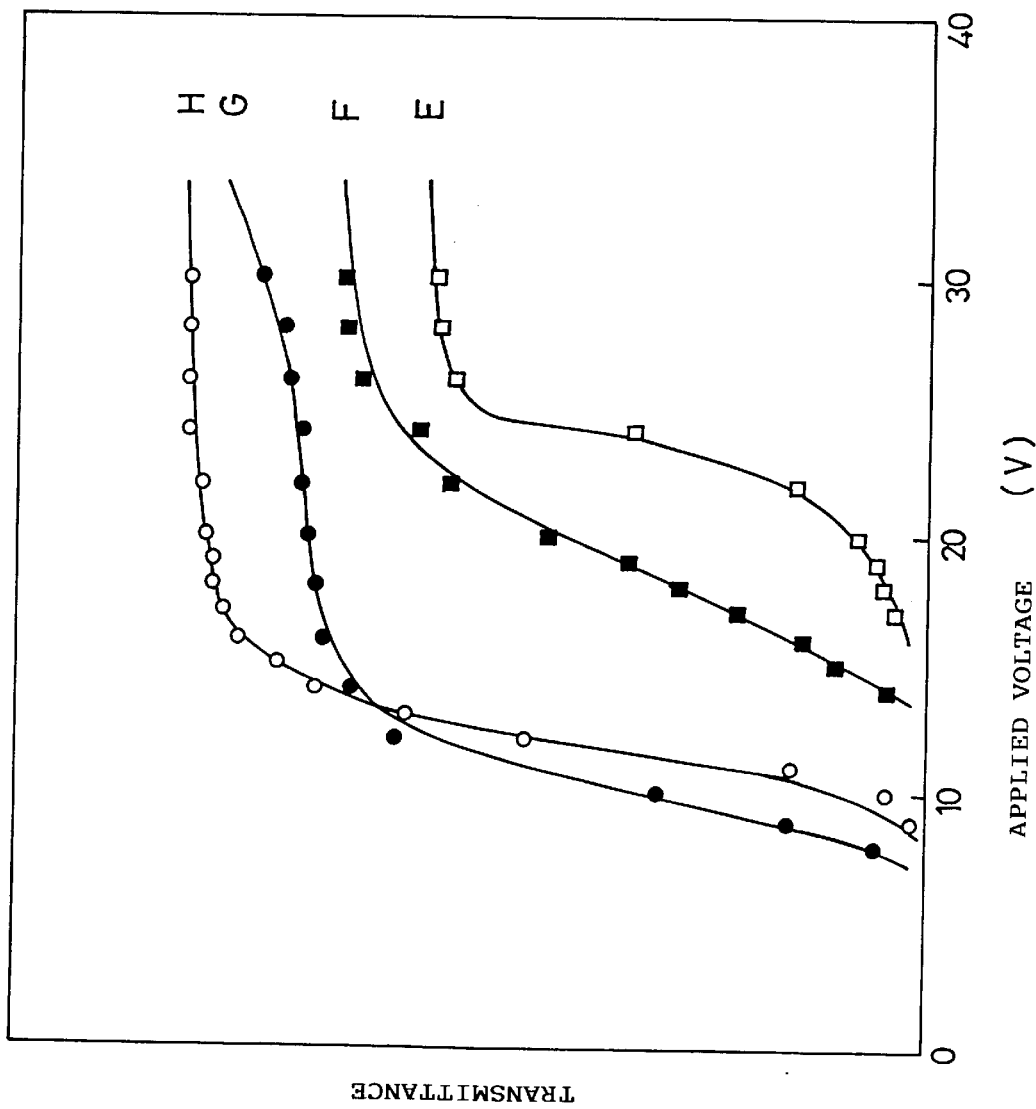
FIG. 7 shows transmission performance of the panels E to H which have been obtained by modulating power of a voltage supplied across electrodes.

Next, a description will be given of a driving method of a third embodiment of the ferroelectric liquid crystal display panel according to the present invention, by referring to FIG. 7. As mentioned before, in the ferroelectric liquid crystal display panel, by modulating the voltage supplied to the liquid crystal layer, namely a power of the driving voltage supplied across the electrodes 11a, 11b, the halftone display may be carried out. FIG. 7 shows transmission performance of the panels E to H which were obtained by modulating the power of the voltage supplied across the electrodes 11a, 11b. The panel E corresponds to the conventional panel.

The steepness in the curve of the panel E suggests almost no change for obtaining the grayshade capability as shown in FIG. 7. In contrast, the gentle steepness in the curve of the panels F and H clarifies the good grayshades capability. Namely, it was proved that, in the driving circuit of the liquid crystal display device, by amplitude-modulating the driving voltage supplied across the electrodes 11a, 11b, an intermediate transmittance according to the applied voltage may be realized. Also the panels M, N according to the second embodiment may produce the same results.

The ferroelectric liquid crystal display device according to the present invention may be combined with a variety of methods which were used for realizing the gray scale in the conventional ferroelectric liquid crystal display device.

Figure 8:
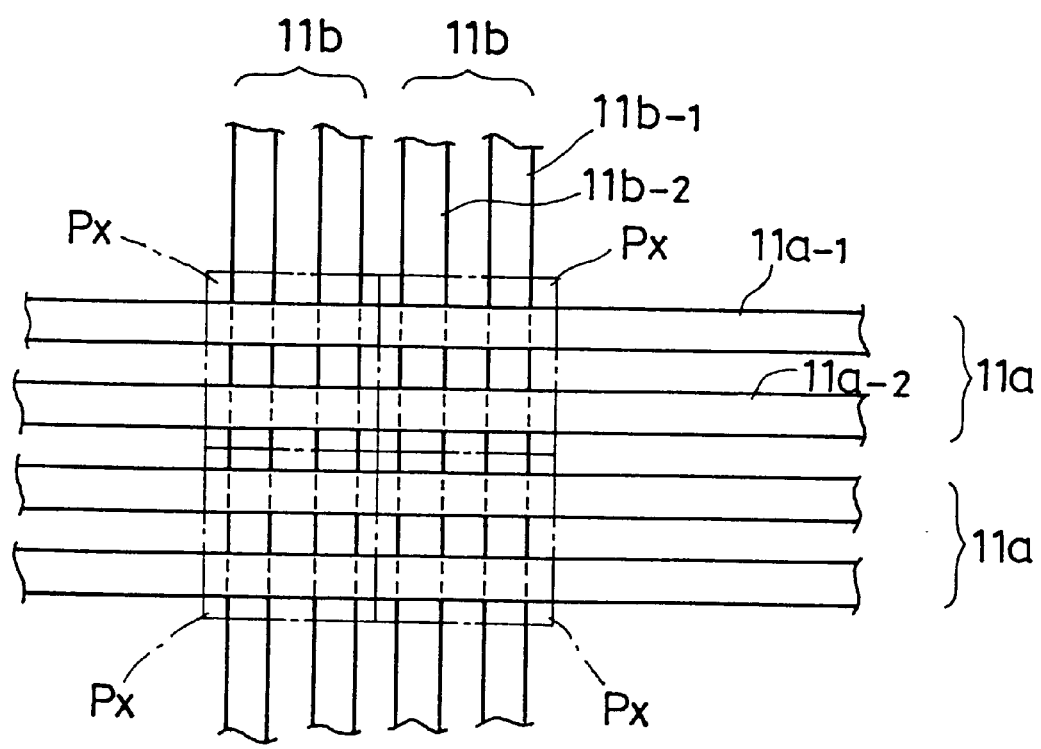
FIG. 8 shows a configuration of the electrodes of a third embodiment of the ferroelectric liquid crystal display panel according to the present invention.

FIG. 8 shows a configuration of the electrodes of the third embodiment of the ferroelectric liquid crystal display panel according to the present invention. In this configuration, a plurality of electrodes 11a-1, 11a-2 as the single electrode 11a and a plurality of electrodes 11b-1, 11b-2 as the single electrode 11b are formed in the single picture element to realize the gray scale display. In this liquid crystal display panel, if the elastic energy is supplied to the liquid crystal layer in either method of the first embodiment or the second embodiment, and the electrodes 11a1, 11a-2 and electrodes 11b-1, 11b-2 are individually driven by an intermediate driving voltage, the gray scale display having further more levels may be realized.

In the ferroelectric liquid crystal display device according to the present invention, the gray scale display may be realized by modulating a pulse width as well as by modulating the magnitude of the applied voltage. In the following, a description will be given of a fourth embodiment of the ferroelectric liquid crystal display device according to the present invention. In the fourth embodiment, the pulse width is modulated.

For this embodiment, the liquid crystal display device shown in FIG. 3 or FIG. 4 is applied. The molecular orientation films 13A, 13B are rubbed such that their rubbing directions cross by an angle of 8 degrees, and the ferroelectric liquid crystal of the naphthalene system is used to fill in the gap between the substrates. In this way, the liquid crystal display panel indicating the index P of 2.7 shown in FIG. 6 is formed. The formed panel corresponds to the panel of the first embodiment, and will realize the halftone display.

FIGS. 9A to 9C show illustrations for explaining a frame modulation in the fourth embodiment according to the present invention. In this embodiment, the panel is driven by a 4-pulse method at a duty ratio of 1/400 and at a bias of ¼ using the waves shown in FIGS. 9A to 9C. An operation voltage is set to 35 V, and the pulse width of each pulse is changed in a range from 10 μsec to 30 μsec. Writing to the display is carried out in two frames. An experiment was carried out in three cases: (i) both data for the first frame and data for the second frame were data indicating black, (2) both data for the first frame and the data for the second frame were data indicating white, (3) the data for the first frame is the data indicating black and the data for the second frame is the data indicating white. In further detail, when writing black data, the pulse having the pulse width of 10 to 30 μsec is used, and the writing for one frame comprising 400 lines is carried out using 4 pulses per 1 line. In this case, if the pulse width is 10 μsec, it takes 40 μsec for writing the 1 line, and 16 msec for writing the 1 frame. When setting the pulse width to 10 μsec and writing black in the first frame and white in the second frame, a gray color scale may be realized. By combining the frame modulation with the amplitude modulation of the driving voltage pulse, or with the tone production method by density of each element shown in the third embodiment, a level number of the gray scale display of the liquid crystal display device may be increased. And by combining with a temperature compensation, a further level of the gray scale display may be realized. It is noted that the gray scale display using the frame modulation is available for the liquid crystal display panels N, M in the second embodiment according to the present invention.

As described above, the present inventions have the following features. In the ferroelectric liquid crystal display device according to the present invention, by supplying the elastic energy to the liquid crystal layer, the directions of the liquid crystal molecules may be torqued according to the voltage supplied to the liquid crystal layer. As a result, by controlling the driving voltage, the halftone display may be realized.

Further, the present invention is not limited to these embodiments, but various variations and modifications may be made without departing from the scope of the present invention.

What is claimed is:

1. A liquid crystal display device comprising:
   a first substrate;
   a first electrode pattern formed on the first substrate;
   a first molecular orientation film, formed on said first substrate to cover said first electrode pattern, for orienting liquid crystal molecules;
   a second substrate formed in a position parallel to and apart from said first substrate;
   a second electrode pattern formed on a surface of the second substrate facing the first substrate;
   a second molecular orientation film, formed on said second substrate to cover said second electrode pattern, for orienting the liquid crystal molecules; and
   a ferroelectric liquid crystal layer which is filled in a gap between said first molecular orientation film and said second molecular orientation film and has a bookshelf-layer type structure;
   wherein internal energy is given to the liquid crystal molecules, and further wherein polarization of the liquid crystal molecules in a bistable state is equally oblique to a direction perpendicular to the first and second substrates so that a halftone can be obtained.

2. The liquid crystal display device as claimed in claim 1, wherein said first molecular orientation film orients the liquid crystal molecules inside said ferroelectric liquid crystal layer in a first direction, and said second molecular orientation film orients the liquid crystal molecules inside the ferroelectric liquid crystal layer in a second direction.

3. A liquid crystal display device comprising:
   a first substrate:
   a first electrode pattern formed on the first substrate;
   a first molecular orientation film, formed on said first substrate to cover said first electrode pattern, for orienting liquid crystal molecules;
   a second substrate formed in a position parallel to and apart from said first substrate;
   a second electrode pattern formed on a surface of the second substrate facing the first substrate;
   a second molecular orientation film, formed on said second substrate to cover said second electrode pattern, for orienting the liquid crystal molecules; and
   a ferroelectric liquid crystal layer filled in a gap between said first molecular orientation film and said second molecular orientation film;
   wherein internal energy is given to the liquid crystal molecules, and further wherein polarization of the liquid crystal molecules in a bistable state is oblique to a direction perpendicular to the first and second substrates;
   and further wherein a chiral pitch of the liquid crystal molecules inside said ferroelectric liquid crystal layer is equal to or less than three times a thickness of the ferroelectric liquid crystal layer.

4. The liquid crystal display device as claimed in claim 3, wherein said first molecular orientation film orients directions of said liquid crystal molecules inside the ferroelectric liquid crystal layer toward a first direction, and said second molecular orientation film orients the directions of said liquid crystal molecules inside the ferroelectric liquid crystal layer toward a second direction.

5. The liquid crystal display device as claimed in claim 3, wherein said first molecular orientation film and said second molecular orientation film orient the molecular orientation molecules inside the ferroelectric liquid crystal layer toward the same direction.

6. A method for driving a liquid crystal display device comprising a first substrate, a first electrode pattern formed on the first substrate, a first molecular orientation film, formed on said first substrate to cover said first electrode pattern, for orienting liquid crystal molecules, a second substrate formed in a position parallel to and apart from said first substrate, a second electrode pattern formed on a surface of the second substrate facing the first substrate, a second molecular orientation film, formed on said second substrate to cover said second electrode pattern, for orienting the liquid crystal molecules, and a ferroelectric liquid crystal layer which is filled in a gap between said first molecular orientation film and said second molecular orientation film and has a bookshelf-layer type structure, wherein a torque balance can be established due to an applied electric field and further wherein the balanced state has a tilt angle corresponding to the applied voltage, which can be made so that a gradation display can be made in accordance with the applied voltage, said method comprising the steps of:
   supplying a driving voltage pulse to said first electrode pattern and said second electrode pattern; and
   changing a height of said driving voltage pulse to obtain a halftone;
   wherein internal energy is given to the liquid crystal molecules, and further wherein polarization of the liquid crystal molecules in a bistable state is equally oblique to a direction perpendicular to the first and second substrates.

7. The method as claimed in claim 6, wherein said first molecular orientation film and said second molecular orientation film respectively orient the liquid crystal molecules inside said ferroelectric liquid crystal layer to a direction by which internal energy is stored in the ferroelectric liquid crystal layer.

8. The method as claimed in claim 6, wherein a chiral pitch of liquid crystal molecules inside the ferroelectric liquid crystal layer is equal to or less than three times a thickness of the ferroelectric liquid crystal layer.

* * * * *